United States Patent [19]

Hunger

[11] 4,096,157

[45] Jun. 20, 1978

[54] AZAMETHINE METAL COMPLEX COMPOUNDS

[75] Inventor: Klaus Hunger, Kelkheim, Taunus, Germany

[73] Assignee: Hoechst Aktiengesellschaft, Frankfurt am Main, Germany

[21] Appl. No.: 725,837

[22] Filed: Sep. 23, 1976

Related U.S. Application Data

[63] Continuation-in-part of Ser. No. 607,999, Aug. 26, 1975, abandoned.

[30] Foreign Application Priority Data

Aug. 28, 1974 Germany .............................. 2441092

[51] Int. Cl.² ................................................ C07F 1/08
[52] U.S. Cl. ............................. 260/438.1; 106/288 Q; 542/406; 542/420; 542/422; 260/429 C; 260/429.9; 260/439 R

[58] Field of Search ............ 260/429 C, 429.9, 439 R, 260/429 R

[56] References Cited

U.S. PATENT DOCUMENTS

| | | | |
|---|---|---|---|
| 3,268,567 | 8/1966 | Cyba .................................. | 260/429.9 |
| 3,700,709 | 10/1972 | Inman et al. ....................... | 260/438.1 |
| 3,723,490 | 3/1973 | Inman et al. ....................... | 260/438.1 |
| 3,875,200 | 4/1975 | L'Eplattenier et al. .......... | 260/429 C |
| 3,939,194 | 2/1976 | L'Eplattenier et al. .......... | 260/439 R |

*Primary Examiner*—Helen M. S. Sneed
*Attorney, Agent, or Firm*—Curtis, Morris & Safford

[57] ABSTRACT

Azamethines which are obtainable by condensation of a 1-formyl-2-hydroxy-3-naphthoic acid arylamide with an ortho-hydroxy- or ortho-methoxy aniline form metal complexes with zinc, cadmium, cobalt, nickel or copper. These complexes are useful as pigments.

9 Claims, No Drawings

AZAMETHINE METAL COMPLEX COMPOUNDS

This is a continuation-in-part of my prior patent application Ser. No. 607,999 filed Aug. 26, 1975, now abandoned.

The present invention provides new water-insoluble azamethine metal complex pigments of the general formula I

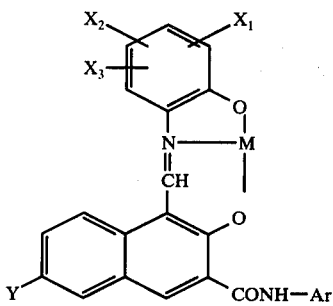

in which $X_1$, $X_2$ and $X_3$ may be identical or different, each representing hydrogen or halogen atoms, alkyl, alkoxy, phenyl, tolyl, nitro, carbo-alkoxy, sulfonamide, mono- or di- alkylsulfonamide, carbonamide, mono- or di-alkylcarbonamide, alkanoylamino groups or a group of the formula

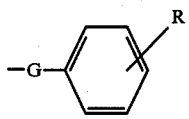

wherein G is —NHCO—, —SO$_2$NH— or —CONH— and R is a hydrogen or chlorine atom, an alkyl, alkoxy, sulfonamide or carbonamide group, $X_1$ and $X_2$ together can form with the phenyl ring a benzimidazolone ring; Y is a hydrogen, chlorine or bromine atom; Ar is the naphthyl group, a phenyl group which can be substituted by 1 to 3 alkyl, alkoxy, alkylsulfonyl, carbalkoxy, trifluoromethyl, nitro, cyano, alkanoylamino, benzoylamino, carbonamide, mono- or di-alkyl-carbonamide, sulfonamide, mono- or di-alkylsulfonamide groups or by halogen atoms; or Ar is the benzimidazolone, chlorobenzimidazolone, quinazolindione, quinoxaline, phthalimide or phthalazine group and M is a zinc, cadmium, cobalt, nickel or copper atom.

Particularly preferred are those pigments of the above formula I in which $X_1$, $X_2$ and $X_3$ are identical or different, representing a hydrogen, chlorine or bromine atom, an alkyl, alkoxy, nitro, acetylamino, benzoylamino, carbomethoxy, carbonamide, alkylcarbonamide or phenylcarbonamide group, Y is a hydrogen, chlorine or bromine atom, Ar is a phenyl group, which may be substituted by 1 to 3 alkyl, alkoxy, alkylsulfonyl, carbalkoxy, trifluoromethyl, nitro, cyano, alkanoylamino, carbonamide, mono- or di-alkyl-carbonamide, sulfonamide, mono- or di-alkylsulfonamide groups, bromine or chlorine atoms, or Ar is the benzimidazolone or the chlorobenzimidazolone group and M represents a nickel, preferably a copper atom.

The terms "alkyl", "alkoxy" and "alkanoyl" signify groups carrying 1 to 4 carbon atoms.

As radicals Ar, there may be mentioned, for example, phenyl-, o-, m-, p-tolyl-, o-, m-, p-methoxyphenyl-, o-, m-, p-ethoxyphenyl-, o-, m-, p-chlorophenyl-, o-, m-, p-bromophenyl-, o-, m-trifluoromethylphenyl, o-, m-, p-nitrophenyl-, 2,4-dimethyl-, 2,5-dimethoxyphenyl-, 2,4-dichlorophenyl-, 2,5-dichlorophenyl-, 2,5-dichlorophenyl-, 2,4,5-trichlorophenyl, 2-chloro-3-methylphenyl-, 2-chloro-4-methylphenyl-, 2-chloro-5-methylphenyl-, 3-chloro-2-methylphenyl-, 4-chloro-2-methylphenyl-, 2-methoxy-5-chloro-phenyl-, 2,5-dimethoxy-4-chloro-phenyl-, 2,4-dimethoxy-5-chloro-phenyl-, 2-methoxy-4-chloro-5-methylphenyl-, 4-acetylamino-phenyl-, 4-benzoylaminophenyl-, benzimidazolyl-, phthalimidyl-, quinoxalyl-, quinazolyl- or phthalazinyl groups.

The invention moreover provides a process for the preparation of the compounds of the formula I, in which azamethines of the general formula II

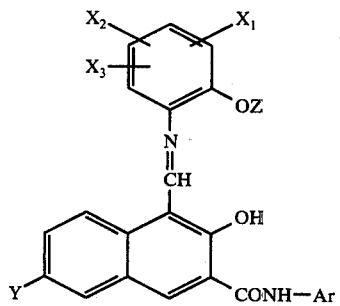

in which $X_1$, $X_2$, $X_3$, Y and Ar are defined as above, Z stands for hydrogen or a methyl group, are treated with a metal-releasing salt of copper, nickel, zinc, cadmium or cobalt.

The metallization is preferably effected, in the usual way, with salts of the bivalent copper, cobalt or nickel, for example, with their chlorides or sulfates, but preferably with their acetates, formates or stearates, in polar organic solvents. Such solvents are, for example, glycolmonomethyl ether, formamide, dimethylformamide, N-methylpyrrolidone, glacial acetic acid, alcohols or mixtures of such solvents, optionally in admixture with water. The metallization process is preferably effected in 2 - 6 hours at temperatures varying between 70° and 180° C; if Z stands for hydrogen, the preferred temperature is up to 150° C.

In the case of metallization of compounds of the formula II with Z = CH$_3$, a desalkylation takes place at the same time. The desalkylating metallization is preferably effected at elevated temperatures in a polar organic solvent, preferably at temperatures between 100° and 180° C. Suitable solvents are, for example, glycolmonomethyl- and monoethyl ethers, dipolar aprotic solvents such as dimethylformamide, dimethylsulfoxide, tetramethylene sulfone or N-methylpyrrolidone.

The metal complexes can be isolated from these solvents by filtration.

For obtaining optimum tinctorial properties with the pigments of the invention, it may sometimes be advantageous to convert the final pigment into a solvent, optionally in the presence of water or a salt solution.

As solvents suitable for this purpose, there may be mentioned those in which the pigments are insoluble but promote a certain degree of superficial dissolving under the finishing conditions, for example aliphatic alcohols, for example ethanol, isopropanol, iso- or n-butanol; chlorinated aromatic solvents, for example chlorobenzene and chlorotoluenes or dichlorobenzenes, as well as dipolar aprotic solvents, for example dimethylformamide, dimethylacetamide, dimethylsulphoxide, polyalkyl ureas and phosphoric acid tris-(dimethylamide).

In some cases, a state of fine division may also be brought about by grinding the pigments with salts or in solvents; the dry grinding operation being preferably performed in a vibrating mill with subsequent separation of the salt by dissolution in water, optionally followed by a wet grinding operation or a high-temperature treatment with solvents.

As salts, there are generally used the alkali metal or alkaline earth metal salts of halohydric acids or of sulphuric acid, for example sodium or potassium chloride and sodium or magnesium sulphate.

The solvents used for the wet grinding operation are generally the same as mentioned above, for example alcohols, acid amides or dimethylsulphoxide.

The non-metallized azamethines of the general formula II can be obtained according to German Offenlegungsschrfit No. 2 408 291 by condensation of one mol of an aldehyde of the general formula III

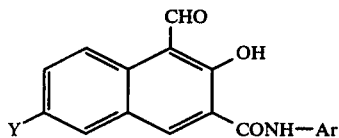

with one mol of an o-aminophenole or o-aminophenol ether of the general formula IV

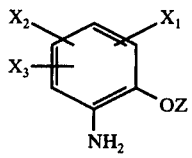

in known manner.

As examples for the aldehydes of the formula III there can be mentioned:

1-formyl-2-hydroxy-3-naphthoic acid-anilide
1-formyl-2-hydroxy-3-naphthoic acid-2'-chloroanilide
1-formyl-2-hydroxy-3-naphthoic acid-4'-chloroanilide
1-formyl-2-hydroxy-3-naphthoic acid-2',4'-dichloroanilide
1-formyl-2-hydroxy-3-naphthoic acid-2',5'-dichloroanilide
1-formyl-2-hydroxy-3-naphthoic acid-2'-methylanilide
1-formyl-2-hydroxy-3-naphthoic acid-4'-methylanilide
1-formyl-2-hydroxy-3-naphthoic acid-2'-methoxyanilide
1-formyl-2-hydroxy-3-naphthoic acid-2'-ethoxyanilide
1-formyl-2-hydroxy-3-naphthoic acid-4'-methoxyanilide
1-formyl-2-hydroxy-3-naphthoic acid-4'-ethoxyanilide
1-formyl-2-hydroxy-3-naphthoic acid-2', 4'-dimethylanilide
1-formyl-2-hydroxy-3-naphthoic acid-2'-methyl-3'-chloroanilide
1-formyl-2-hydroxy-3-naphthoic acid-2', 5'-dimethoxyanilide
1-formyl-2-hydroxy-3-naphthoic acid-2', 5'-dimethoxy-4'-chloroanilide
1-formyl-2-hydroxy-3-naphthoic acid-2', 4'-dimethoxy-5'-chloroanilide
1-formyl-2-hydroxy-3-naphthoic acid-4'-acetylaminoanilide
1-formyl-2-hydroxy-3-naphthoic acid-4'-benzoylaminoanilide
1-formyl-2-hydroxy-3-naphthoic acid-3'-trifluoromethylanilide
1-formyl-2-hydroxy-3-naphthoic acid-2'-nitroanilide
1-formyl-2-hydroxy-6-bromo-3-naphthoic acid anilide
1-formyl-2-hydroxy-3-naphthoyl-5'-aminobenzimidazolone
1-formyl-2-hydroxy-3-naphthoyl-5'-amino-7'-chlorobenzimidazolone
1-formyl-2-hydroxy-3-naphthoyl-6'-aminoquinazolindione
1-formyl-2-hydroxy-3-naphthoyl-7'-aminoquinazolinidone
1-formyl-2-hydroxy-3-naphthoyl-6'-aminoquinoxaline
1-formyl-2-hydroxy-3-naphthoyl-4'-aminophthalimide
1-formyl-2-hydroxy-3-naphthoyl-6'-aminophthalazine As examples for 2-hydroxy or 2-alkoxyamines of the general formula IV there can be mentioned 2-aminophenol, 2-amino-4-chlorophenol, 2-amino-5-chlorophenol, 2-amino-6-chlorophenol, 2-amino-4-bromophenol, 1-amino-2-naphthol, 2-amino-4-nitrophenol, 2-amino-5-nitrophenol, 2-methoxy-5-acetylaminoaniline, 2-methoxy-5-methyl-4-benzoylaminoaniline, 5-amino-4-hydroxy-1,2-xylene, 5-amino-4-hydroxy-1,3-xylene, 6-chloro-4-amino-3-hydroxy-toluene, 4,6-dichloro-2-aminophenol, 3,4,6-trichloro-2-aminophenol, 3,4,6-tetrachloro-2-aminophenol, 5-nitro-3-amino-2-hydroxytoluene, 5-nitro-3-amino-4-hydroxytoluene, 4,6-dinitro-2-aminophenol, 6-chloro-4-nitro-2-aminophenol, 4-chloro-5-nitro-2-aminophenol, 4-chloro-6-nitro-2-aminophenol, 5-chloro-2-aminoanisol, 6-chloro-2-aminoanisol, 4-nitro-2-aminoanisol, 5-nitro-2-aminoanisol, 3,5-dinitro-2-aminoanisol, 4-chloro-5-nitro-2-aminoanisol, 2-amino-1,4-dimethoxybenzene, 2-amino-4-acetaminoanisol, 3-amino-4-hydroxybenzoic acid methyl ester, 3-amino-4-methoxybenzoic acid amide, 3-amino-4-methoxybenzoic acid anilide, 3-amino-4-methoxy-benzoic acid-3'-chloro-2'-methylanilide, 3-amino-4-methoxybenzoic acid-2', 5'-dichloroanilide, 5-amino-6-hydroxybenzimidazolone-2 or 5-amino-6-hydroxy-7-chlorobenzimidazolone-2.

The new compounds are valuable pigments suitable in particular for printing pastes and inks, for disperse dyes, lacquers and for incorporation into high-molecular-weight organic materials, for example cellulose ethers and -esters such as cellulose acetate or nitrate, polyamides, polyurethanes or polyesters such as polyethylene glycol terephthalate, natural or synthetic resins, for example aminoplasts, especially urea- and melamine-formaldehyde resins, alkyd resins, phenoplasts, polycarbonates, polyolefines, for example polyethylene or polypropylene, polyvinyl chloride, polyacrylonitrile, polyacrylic acid esters, rubber, casein resins, silicones and silicone resins, as such or in admixture with one another. For such an incorporation, it is immaterial whether the above-mentioned high-molecular-weight compounds are in the form of plastic masses, melts or spinning solutions, lacquers or printing pasts or inks. Depending on the intended purpose, it is useful to incorporate the new pigments as toners or in the form of preparations.

The new pigments excell particularly by their high tinctorial strength and transparency, their good fastness to migration, especially to overlacquering and their excellent fastness to light and weathering. They are therefore excellently suitable for the pigmentation of metal-effect lacquers.

The following examples illustrate the invention. Temperatures are indicated in ° C.

EXAMPLE 1

29.2 g of 1-formyl-2-hydroxy-3-naphthoic acid anilide were added to 200 ml of ethanol and 200 ml of water and vigourously stirred for 15 minutes. Afterwards, 11.4 g of 2-aminophenol were added, vigourously stirring was continued for one hour while covering the reaction vessel with nitrogen. The reaction mixture was then heated and maintained at 60° during 90 minutes; afterwards it was cooled, the crystals were suction-filtered, washed with water and dried at 60°.

The yield of the yellow azamethine was almost quantitative (38 g).

19.1 g of the so obtained azamethine were dissolved in 100 ml of dimethylformamide and 10 g of copper (II) acetate in 100 ml of glycol-dimethyl ether were added. The mixture was stirred for 4 hours at 105°, then it was cooled and the precipitate was suction-filtered at room temperature. The filter residue was washed with dimethylformamide and afterwards with water and then dried. 18.3 g of the deep-yellow colored azamethine copper-complex of the formula

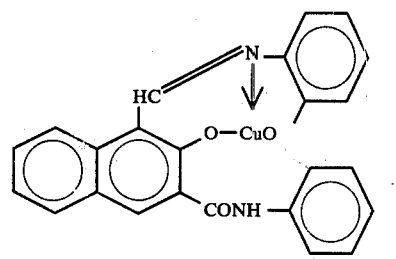

were obtained.

EXAMPLES 2-42

It is possible to obtain other azamethine complexes (I), when azamethines of the general formula II, obtained by condensation of aldehydes of the formula III as indicated in example 1, with amines of the formula IV, react with metal salts as demonstrated in example 1.

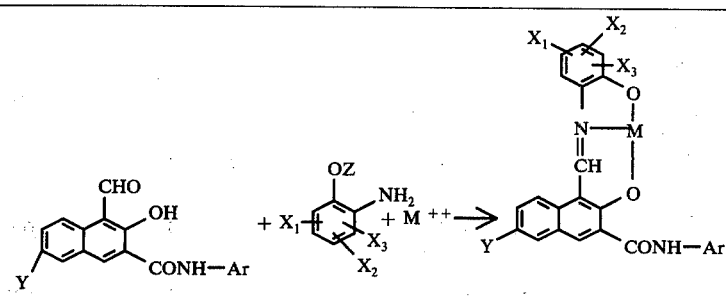

| Example | Ar | Y | $X_1$ | $X_2$ | $X_3$ | Z | $M^{++}$ | Shade in the lacquer |
|---|---|---|---|---|---|---|---|---|
| 2 | —⌬ | H | 4-Cl | H | H | H | Cu | reddish yellow |
| 3 | CH$_3$—⌬ | H | H | H | H | H | Cu | " |
| 4 | H$_3$C—⌬ | H | 4-OCH$_3$ | H | H | H | Cu | " |
| 5 | H$_3$CO—⌬—Cl, OCH$_3$ | H | H | H | H | H | Cu | yellow-orange |
| 6 | H$_3$CO—⌬—Cl, OCH$_3$ | H | 5-C$_6$H$_5$ | H | H | H | Cu | reddish yellow |
| 7 | OCH$_3$—⌬ | H | 4-COOCH$_3$ | H | H | H | Cu | " |
| 8 | OC$_2$H$_5$—⌬ | H | H | H | H | H | Cu | reddish yellow |
| 9 | —⌬ | H | 4-NHCOCH$_3$ | H | H | CH$_3$ | Cu | " |

-continued $$\underset{\text{III}}{\text{[naphthalene structure with CHO, OH, Y, CONH-Ar]}} + \underset{\text{IV}}{\text{[benzene with OZ, NH}_2\text{, X}_1\text{, X}_2\text{, X}_3\text{]}} + M^{++} \rightarrow \underset{\text{I}}{\text{[metal complex structure]}}$$

| Example | Ar | Y | $X_1$ | $X_2$ | $X_3$ | Z | $M^{++}$ | Shade in the lacquer |
|---|---|---|---|---|---|---|---|---|
| 10 | naphthyl | H | 4-SO$_2$NHCH$_3$ | H | H | H | Cu | " |
| 11 | 3-NO$_2$-phenyl | Cl | 4-CONH$_2$ | H | H | H | Cu | " |
| 12 | 3-SO$_2$CH$_3$-phenyl | H | 4-CONH—C$_6$H$_5$ | H | H | CH$_3$ | Cu | " |
| 13 | 2-CH$_3$-phenyl | H | 5-NHCO—C$_6$H$_5$ | 4-CH$_3$ | H | CH$_3$ | Cu | yellow-orange |
| 14 | phenyl | Br | 5-Cl | H | H | H | Cu | " |
| 15 | phenyl | H | 6-Cl | H | H | H | Zn | yellow |
| 16 | 2-Cl-phenyl | H | 4-Br | H | H | H | Cu | reddish yellow |
| 17 | 2,4-diCl-phenyl | H | 4-Cl | 5-CH$_3$ | H | H | Cu | yellow |
| 18 | 4-Cl-phenyl | H | 4-Cl | 6-Cl | H | H | Ni | " |
| 19 | 3-CF$_3$-phenyl | H | 5-NO$_2$ | 6-CH$_3$ | H | H | Cu | " |
| 20 | 4-NHCOCH$_3$-phenyl | H | 5-Cl | — | H | CH$_3$ | Cu | reddish yellow |
| 21 | 2-CH$_3$,5-substituted phenyl | H | 4,5-NH—C(O)—NH | | H | H | Cu | " |
| 22 | 2-(NHCONH)phenyl | H | 4-Cl | H | H | H | Cu | brown-yellow |
| 23 | 2-OCH$_3$-phenyl | H | 3-Cl | 4-Cl | 6-Cl | H | Cu | greenish yellow |
| 24 | 4-CONH$_2$-phenyl | H | H | H | H | H | Cu | reddish yellow |
| 25 | 3-SO$_2$NHCH$_3$-phenyl | H | H | H | H | H | Cu | " |

-continued

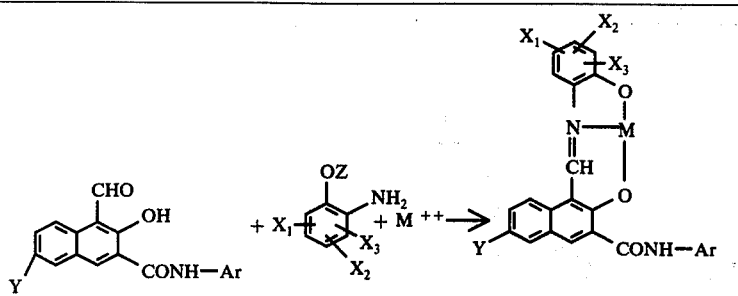

| Example | Ar | Y | $X_1$ | $X_2$ | $X_3$ | Z | $M^{++}$ | Shade in the lacquer |
|---|---|---|---|---|---|---|---|---|
| 26 | –⟨C₆H₄⟩–NHCOC₆H₅ | H | 4-CONHC₆H₅ | H | H | H | Cu | reddish yellow |
| 27 | –⟨C₆H₄⟩–CO₂CH₃ | H | H | H | H | H | Cu | " |
| 28 | –⟨C₆H₄⟩–CN | H | H | H | H | H | Cu | " |
| 29 | –⟨C₆H₄⟩–CH₃ | H | 4-Br | H | H | H | Cu | " |
| 30 | –⟨C₆H₄⟩–Br | H | H | H | H | H | Cu | " |
| 31 | –⟨C₆H₄⟩(CH₃O) | H | H | H | H | H | Cu | reddish yellow |
| 32 | –⟨C₆H₅⟩ | H | 4-Cl | 5-NO₂ | H | H | Cu | " |
| 33 | –⟨C₆H₄⟩–CH₃ | H | 4-COOCH₃ | H | H | H | Cu | " |
| 34 | –⟨C₆H₄⟩–CH₃ | H | 4-CH₃ | H | H | H | Cu | " |
| 35 | –⟨C₆H₄⟩(CH₃O) | Br | 4-COOCH₃ | H | H | H | Cu | orange |
| 36 | –⟨C₆H₄⟩–Cl | H | 4-COOCH₃ | H | H | H | Cu | reddish yellow |
| 37 | –⟨C₆H₃⟩(Cl)(Cl) | H | 4-COOCH₃ | H | H | H | Cu | yellow |
| 38 | benzimidazolone-Cl | H | H | H | H | H | Cu | orange |
| 39 | quinazolinedione | H | H | H | H | H | Cu | reddish yellow |

-continued

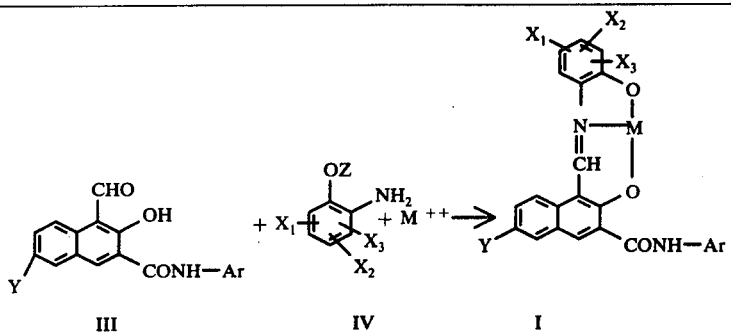

| Example | Ar | Y | $X_1$ | $X_2$ | $X_3$ | Z | $M^{++}$ | Shade in the lacquer |
|---|---|---|---|---|---|---|---|---|
| 40 | (NH-C=O, NH-C=O ring) | H | H | H | H | H | Cu | orange |
| 41 | (isoquinoline-1,3-dione) | H | 4-Cl | H | H | H | Cu | brown yellow |
| 42 | (phthalazine-1,4-dione) | H | 4-Cl | H | H | H | Cu | brown yellow |

I claim:

1. A compound of the formula

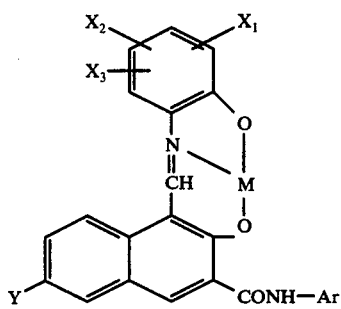

wherein $X_1$, $X_2$ and $X_3$, which are identical or different, are hydrogen, halogen, lower alkyl, lower alkoxy, phenyl, tolyl, nitro, lower carboalkoxy, sulfonamide, lower mono- or dialkyl sulfonamide, carbamoly, lower mono- or dialkyl carbamoyl, lower alkanoyl or a group of the formula

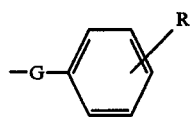

wherein G is —NHCO—, —SO$_2$NH— or —CONH— and R is hydrogen, chlorine, lower alkyl, lower alkoxy, sulfonamide or carbamoyl, Y is hydrogen, chlorine or bromine; Ar is naphthyl, phenyl or phenyl substituted by 1 to 3 equal or different substituents selected from lower alkyl, lower alkoxy, lower alkylsulfonyl, lower carboalkoxy, trifluoromethyl, nitro, cyano, lower alkanoylamino, benzoylamino, carbamoyl, lower mono- or dialkyl carbamoyl, sulfonamide, lower mono- or dialkyl sulfonamide and halogen; and M is zinc, cadmium, cobalt, nickel or copper.

2. A compound as in claim 1, wherein $X_1$, $X_2$ and $X_3$ are hydrogen, chlorine, bromine, lower alkyl, lower alkoxy, nitro, acetamino, carbomethoxy, carbamoyl, lower alkyl carbamoyl, phenylcarbamoyl; Y is hydrogen, chlorine or bromine; Ar is phenyl or phenyl substituted by 1 to 3 substituents selected from lower alkyl, lower alkoxy, lower alkyl-sulfonyl, lower carboalkoxy, trifluoromethyl, nitro, cyano, lower alkanoylamino, benzoylamino, carbamoyl, lower mono- or dialkyl carbamoyl, sulfonamide, lower mono- or dialkylsulfonamide, bromo and chloro; and M is nickel or copper.

3. A compound as claimed in claim 1 having the formula

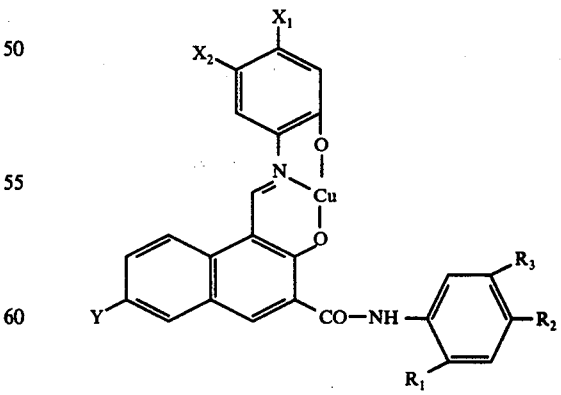

wherein Y is hydrogen or bromine, $X_1$ is hydrogen, chlorine or lower carboalkoxy, $X_2$ is hydrogen or nitro, $R_1$ is hydrogen, lower alkyl or lower alkoxy; $R_2$ is hydrogen or chlorine and $R_3$ is hydrogen or lower alkoxy.

4. The compound as claimed in claim 3, wherein Y, $X_1$ and $X_2$ are hydrogen, $R_1$ and $R_3$ are methoxy and $R_2$ is chlorine.

5. The compound as claimed in claim 3, wherein Y, $X_1$, $X_2$, $R_2$ and $R_3$ are hydrogen and $R_1$ is ethoxy.

6. The compound as claimed in claim 3, wherein Y, $X_1$, $X_2$, $R_2$ and $R_3$ are hydrogen and $R_1$ is methoxy.

7. The compound as claimed in claim 3, wherein Y, $R_1$, $R_2$ and $R_3$ are hydrogen, $X_1$ is chlorine and $X_2$ is nitro.

8. The compound as claimed in claim 3, wherein Y, $X_2$, $R_2$ and $R_3$ are hydrogen, $X_1$ is carbomethoxy and $R_1$ is methyl.

9. The compound as claimed in claim 3, wherein $X_2$, $R_2$ and $R_3$ are hydrogen, Y is bromine, $X_1$ is carbomethoxy and $R_1$ is methoxy.

* * * * *